US009585296B1

(12) United States Patent
Forster

(10) Patent No.: US 9,585,296 B1
(45) Date of Patent: Mar. 7, 2017

(54) ROCK RAKE ATTACHMENT FOR ENGINEERING VEHICLE

(71) Applicant: VERSARAKE, LLC, Kerrville, TX (US)

(72) Inventor: John Forster, Kerrville, TX (US)

(73) Assignee: VERSARAKE, LLC, Kerrville, TX (US)

( * ) Notice: Subject to any disclaimer, the term of this patent is extended or adjusted under 35 U.S.C. 154(b) by 0 days.

(21) Appl. No.: 15/049,207

(22) Filed: Feb. 22, 2016

Related U.S. Application Data

(60) Provisional application No. 62/212,247, filed on Aug. 31, 2015.

(51) Int. Cl.
*A01B 43/00* (2006.01)

(52) U.S. Cl.
CPC .................................. *A01B 43/00* (2013.01)

(58) Field of Classification Search
CPC .... E02F 7/06; E02F 3/40; E02F 3/407; A01B 43/00; B07B 1/14; B07B 1/15
USPC .................. 171/14, 15, 63, 74, 83; 414/375; 209/418, 419, 421, 660, 662, 667, 673, 209/674, 675; 37/419, 431, 444
See application file for complete search history.

(56) References Cited

U.S. PATENT DOCUMENTS

| | | | | | |
|---|---|---|---|---|---|
| 208,747 | A | * | 10/1878 | Love ...................... | A01D 17/10 171/109 |
| 1,025,587 | A | * | 5/1912 | Norman ................ | B01L 3/5027 209/631 |
| 3,540,534 | A | * | 11/1970 | Rhoads ................ | A01B 43/005 171/63 |
| 3,833,119 | A | * | 9/1974 | Brown ..................... | B07B 13/07 119/216 |
| 4,005,755 | A | * | 2/1977 | Bakke .................... | A01B 43/00 171/13 |
| 4,316,543 | A | * | 2/1982 | Leonhardt ............. | C22B 1/2406 198/494 |
| 4,627,541 | A | * | 12/1986 | Johnson .................... | B07B 1/14 209/394 |
| 4,727,714 | A | * | 3/1988 | Karakolev ........... | A01D 45/006 171/14 |
| 4,805,703 | A | * | 2/1989 | Carlsson ................... | E02F 7/06 171/132 |
| 5,279,427 | A | * | 1/1994 | Mobley ................. | B07B 13/003 198/780 |
| 5,398,430 | A | * | 3/1995 | Scott ..................... | E02F 3/3681 37/142.5 |
| D361,772 | S | | 8/1995 | Hulsey | |

(Continued)

*Primary Examiner* — Jamie L McGowan
(74) *Attorney, Agent, or Firm* — Gunn, Lee & Cave, P.C.

(57) ABSTRACT

An attachment for an engineering vehicle that has a first side having an outer surface, an inner surface, and a first plurality of surfaces extending between the outer surface and the inner surface defining a first plurality of holes having a hole diameter; a second side having an outer surface, an inner surface, and a second plurality of surfaces extending between the outer surface and the inner surface defining a second plurality of holes having the hole diameter; and a plurality of rods occupying at least some of the first plurality of holes and at least some of the second plurality of holes, each rod having a first end, a second end, a longitudinal axis intersecting the first end and the second end, a rod length between the first end and the second end along the longitudinal axis, and a rod diameter.

19 Claims, 4 Drawing Sheets

(56) References Cited

U.S. PATENT DOCUMENTS

| | | | | |
|---|---|---|---|---|
| 5,449,072 | A * | 9/1995 | Braun | B07B 13/16 |
| | | | | 209/675 |
| 5,816,912 | A * | 10/1998 | Clark | A01D 33/02 |
| | | | | 171/28 |
| 6,059,119 | A * | 5/2000 | Davis | B07B 1/28 |
| | | | | 172/816 |
| 6,092,606 | A * | 7/2000 | Basler | A01B 43/00 |
| | | | | 171/63 |
| 6,408,551 | B1 * | 6/2002 | Pettersson | B07B 1/12 |
| | | | | 37/409 |
| 6,718,662 | B1 | 4/2004 | Schaff | |
| 6,889,851 | B1 * | 5/2005 | Isola | D21C 7/14 |
| | | | | 209/666 |
| 6,990,758 | B1 | 1/2006 | Holmes et al. | |
| 7,013,982 | B2 * | 3/2006 | Northcutt | E02F 3/655 |
| | | | | 171/1 |
| 7,055,698 | B1 * | 6/2006 | Keigley | A01B 43/00 |
| | | | | 209/420 |
| 7,066,275 | B1 * | 6/2006 | Keigley | A01B 43/00 |
| | | | | 171/111 |
| 7,549,544 | B1 * | 6/2009 | Currey | B07B 1/15 |
| | | | | 209/662 |
| 8,033,340 | B2 * | 10/2011 | Majkrzak | A01D 17/10 |
| | | | | 171/14 |
| 8,083,073 | B1 * | 12/2011 | Brown | B08B 1/008 |
| | | | | 209/233 |
| 8,360,249 | B1 * | 1/2013 | Currey | B07B 1/15 |
| | | | | 209/671 |
| 8,534,371 | B2 | 9/2013 | Roessler | |
| 8,893,409 | B1 * | 11/2014 | Rossi, Jr. | E02F 7/06 |
| | | | | 209/660 |
| 9,080,314 | B1 * | 7/2015 | Rossi, Jr. | B07B 1/46 |
| 2015/0252550 | A1 * | 9/2015 | Paski | B07B 1/12 |
| | | | | 37/444 |

* cited by examiner

ROCK RAKE ATTACHMENT FOR ENGINEERING VEHICLE

CROSS REFERENCES TO RELATED APPLICATIONS

This original nonprovisional application claims the benefit of and priority to U.S. provisional application Ser. No. 62/212,247, filed Aug. 31, 2015, which is incorporated by reference herein.

FEDERALLY SPONSORED RESEARCH

Not applicable.

BACKGROUND OF THE INVENTION

1. Field of the Invention

This invention relates generally to material handling. More specifically, this invention is an attachment for an engineering vehicle that facilitates the removal of rocks and other undesirable material during preparation of land for a use.

2. Description of the Related Art

Engineering vehicles such as skid steers and tractors are commonly used for a variety of useful purposes such as farming, construction, and landscaping. They are typically fitted with mechanisms to allow a variety of different useful attachments for different purposes, such as an auger, a trencher, or a snow plow. These attachments are connected to the vehicle via a mounting system, which may be universal or, alternatively, specific to a particular brand of vehicle.

One common attachment for such vehicles is known as a rock rake, which is generally used for removing rock from top soil in an area. A simple rock rake attachment looks like a large hand rake connectable to the vehicle. U.S. Pat. No. 6,990,758, for example, teaches an attachment mountable to a bucket of an excavator, thus avoiding the work and expense of removing the bucket from the arm. The scraper portion and a rake are included in a single unit that is attachable and detachable from the excavator bucket. Scraper and blade attachments are either detachably connected to the unit with bolts or permanently welded in place as desired. See also U.S. Pat. No. D361,772.

Other types of rock rakes include a bucket for scooping and retaining material. U.S. Pat. No. 6,718,662, for example, teaches an attachment that comprises a plurality of teeth supported in a frame that attaches to the bucket of a front end loader.

U.S. Pat. No. 8,534,371 teaches an attachment for picking rocks and sorting them with a rotatable drum. The operator moves the drum across the surface as desired to direct rocks or other objects into the drum. When the operator elevates the drum, soil passes out of the drum through openings while rocks are retained. Drum rotation facilitates separation of the rocks from the material.

U.S. Pat. No. 7,066,275 teaches a bucket that includes a frame mounted on the outer end thereof that supports removable and replaceable grates. Tines extend from the outer transverse edge of the frame supporting the grates and are adapted to collect and dig under rocks, which are forced up the tines and onto the grate by the normal forward movement of the vehicle. Periodically, when the grates become full of rock, the operator pivots the implement, thereby dumping the rocks into the bucket. The bucket includes a perforated grated floor through which additional dirt may be removed from the rocks and dropped back onto the soil while the rocks remain in the bucket.

Each of the above-referenced patents is incorporated by reference herein.

BRIEF SUMMARY

The invention comprises an attachment for an engineering vehicle. The attachment has a first side having an outer surface, an inner surface, and a first plurality of surfaces extending between the outer surface and the inner surface defining a first plurality of holes having a hole diameter; a second side having an outer surface, an inner surface, and a second plurality of surfaces extending between the outer surface and the inner surface defining a second plurality of holes having the hole diameter; and a plurality of rods occupying at least some of the first plurality of holes and at least some of the second plurality of holes, each rod having a first end, a second end, a longitudinal axis intersecting the first end and the second end, a rod length between the first end and the second end along the longitudinal axis, and a rod diameter.

DETAILED DESCRIPTION OF CERTAIN EMBODIMENTS

Figure 1:
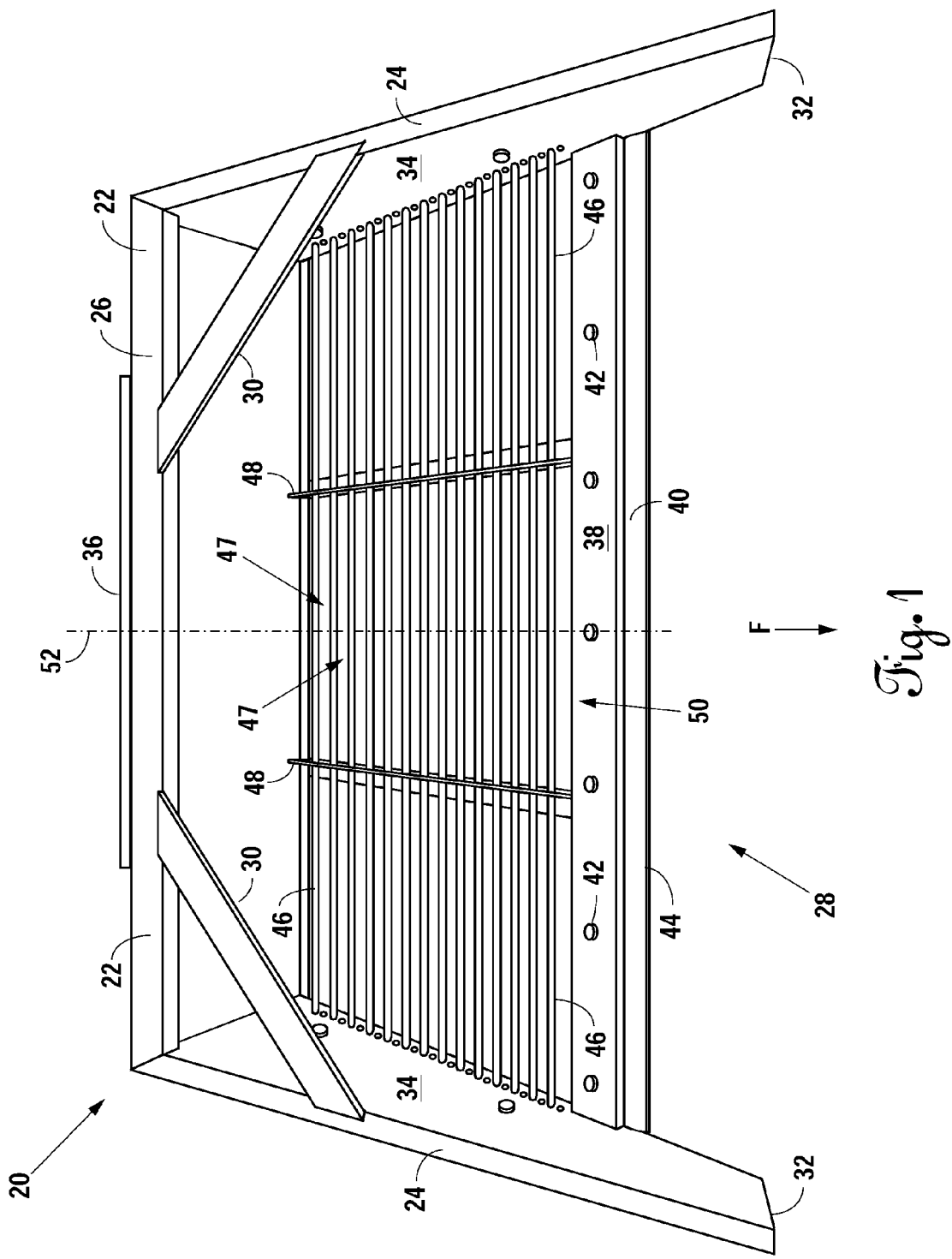
FIG. 1 is a front top view of one embodiment of the invention.

FIG. 1 shows an embodiment 20 of the invention, which embodiment 20 includes a steel frame 22 having sides 24, a back 26, and an open front end 28. The sides 24 and back 26 are connected with struts 30. Each side 24 has a front end 32 and a planar inside surface 34. A mounting plate 36 is attached to the back 26 to provide for attachment to an engineering vehicle. A metal crossbar 38 extends between and is connected to the sides 24. A hardened scraper 40 made from 1055 carbon-based steel is fastened to the crossbar 38 with bolts 42. The scraper 40 has a front edge 44 aligned with the bottoms of the sides 24. A number of cylindrical metal rods 46 extend between the sides 24 through two L-shaped beams 48 connected (e.g., welded) to the back 26 and the crossbar 38 in a generally planar configuration, with spaces 47 between any two adjacent rods 46. A working volume 50 is bounded by the sides 24, the back 26, the crossbar 38, the rods 46, and the spaces 47. The embodiment 20 is symmetrical about a center plane 52.

Figure 2:
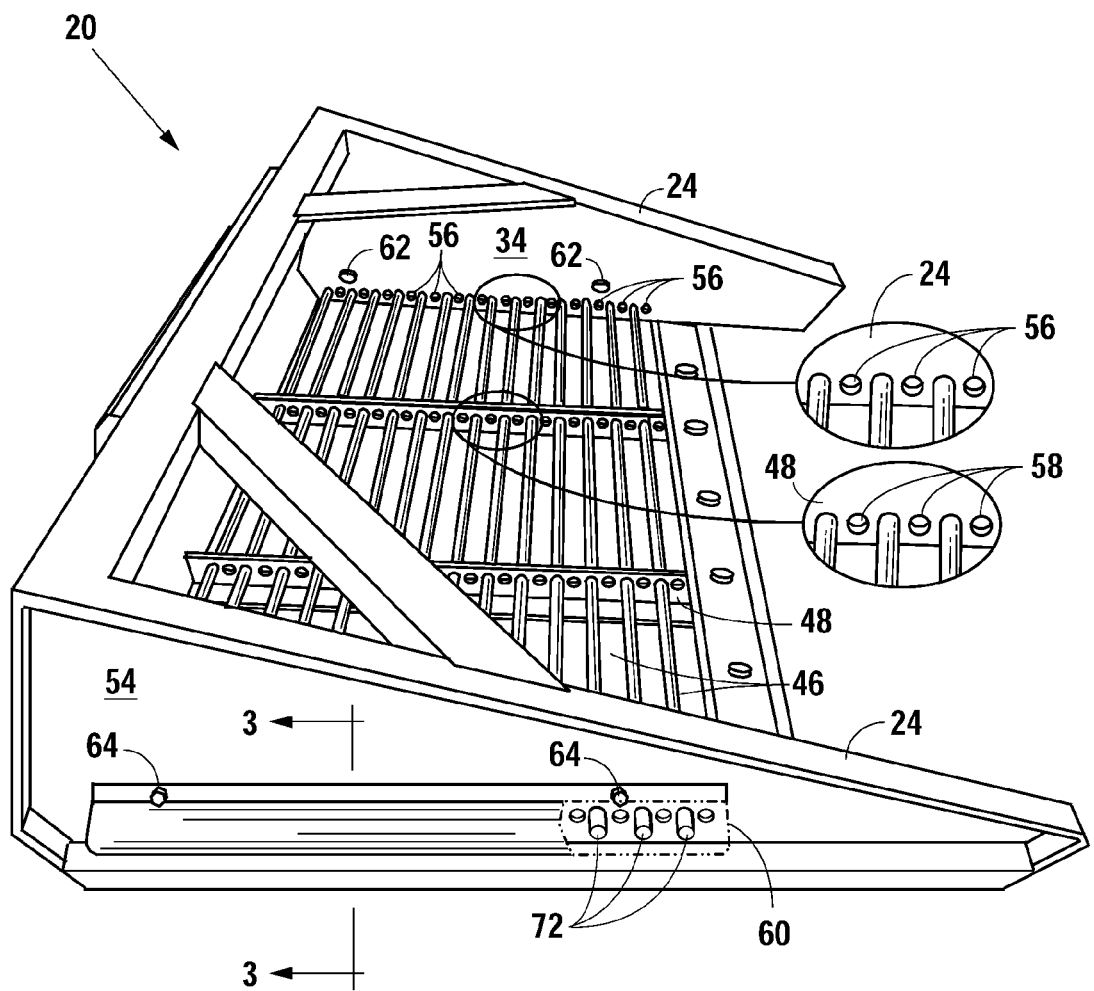
FIG. 2 is a side top view of the embodiment.

Referring to FIG. 2, each side 24 has an outer surface 54. A number of identically sized holes 56 are disposed through each of the sides 24 and defined by cylindrical surfaces extending between each side's inner surface 34 and outer surface 54. Each hole 56 disposed through one side 24 is axially aligned with a corresponding hole 56 in the opposing side 24 to form a pair of axially aligned holes. Moreover, each pair of axially aligned holes is further axially aligned with a hole 58 through each of the L-shaped beams 48 to form a set of four axially aligned holes—two holes 56 in the sides 24 and one hole 58 through each L-shaped beam 48.

In this embodiment, the rods 46 have a ⅞-inch diameter and the holes 56, 58 have a one-inch diameter. Alternative embodiments, however, contemplate various sized and shaped rods, including rods with non-circular cross-sections (e.g., hexagonal, square, octagonal, etc.). For non-circular profiles, the rod diameter is the greatest width of the profile through the longitudinal axis of the rod.

Figure 3:
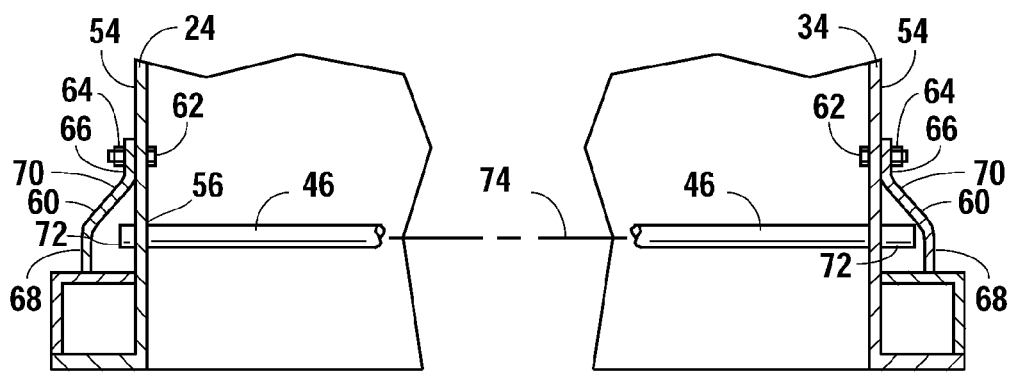
FIG. 3 is a section view through line 3-3 of FIG. 2.

Referring jointly to FIGS. 2-3, a plate 60 is connected to the outer surface 54 of each side 24 using bolts 62 and nuts 64. The plate 60 has a generally elongate, planar first section 66 that contacts the side outer surface 54, a generally elongate planar second section 68 spaced a distance from but parallel to the outer surface 54, and an intermediate section 70 connected to the first section 66 and the second section 68. The intermediate section 70 is angled relative to the first section 66 and second section 68. Each bolt 62 extends through the first section 66 and the side 24 and is engaged with a corresponding nut 64.

Referring to FIG. 3, each rod 46 has two opposing ends 72 and a cylindrical axis 74 that is perpendicular to the mid-plane 52. Because of the relationship between the rods 46 and holes 56, 58, each rod 46 is generally free to move in three ways: translationally along its cylindrical axis 74, rotationally around its cylindrical axis 74, and radially relative to the axes of the holes 56. To allow translational movement, each rod 46 has a length less than the distance between the second sections 68 of the two plates 60 to allow a longitudinal play between the opposing plates 60. When one end 72 of a rod 46 is in contact with one plate 60, the opposing end 72 is not in contact with the opposing plate 60. To facilitate rotation and radial movement of each rod 46, the diameter of each rod 46 is less than the diameter of the inner surfaces defining corresponding holes 56, 58 to inhibit an interference fit and allow the rod 46 to rotate generally freely within its associated holes 56, 58.

In alternative embodiments, the rods 46 may be held in place with alternative means. For example, in one alternative embodiment, the rods 46 may be welded to the sides 24 and/or to the L-shaped beams 48, although this would have the less preferred effect of limiting movement of the rod relative to the embodiment described in FIG. 3. In still other embodiments, the rods 46 may be clipped or otherwise fastened to the plates 60 or the sides 24.

Operation of the embodiment 20 is described with reference to FIG. 1. Typically, the embodiment 20 is attached to an engineering vehicle at the mounting plate 36. Thereafter, the embodiment 20 is lowered to the ground surface by the vehicle operator and the vehicle moved forward generally in direction F with the scraper 40 in contact with the ground surface. This action causes material (e.g., top soil, rocks, or debris) to enter the working volume 50. Once in the working volume 50, smaller material is allowed to fall from the working volume through the spaces 47 between adjacent rods 46 and fall to the ground. Larger material is retained in the working volume 50 by the rods 46 and may be pushed toward the back 22.

Movement of the rods 46 helps facilitate separation of smaller and larger material. Because the rods 46 are free to move longitudinally along its axis 74, rotationally around its axis 74, and radially relative to the associated holes 56, 58, the rods 46 will tend to move with movement of the attached vehicle and thus cause movement and shifting of the material contained within the working volume. Such movement facilitates separation of smaller material that, for example, will not pass through the spaces 47 when orientated one way, but will pass through the spaces 47 when oriented other ways.

In addition, the lateral (e.g., side-to-side) configuration of the rods 46 inhibits accumulation of material within the working volume 50. By comparison, in attachments having elongate members running front-to-back, for example, material tends to accumulate on the elongate members and ride along the member as the attachment moves forward with the vehicle. In contrast, the lateral rod configuration of the embodiment 20 results in less accumulation of such material, as forward movement of the attachment causes accumulated material to fall into the next adjacent rearward space 47 as additional material enters the working volume 50 from the open front end 28. In alternative embodiments where the rods 46 are not free to move in one or more of the ways described with reference to FIG. 3, the lateral configuration still provides this advantage.

With this embodiment 20, the number of rods 46 may be changed to accommodate the characteristics of the material to be worked. FIGS. 1-2 show the use of one rod 46 for every two sets of four holes 56, 58. The configuration may be modified to provide larger spaces 47 (e.g., one rod for every three sets of holes 56, 58) smaller spaces 47 (e.g., one rod for every set of holes 56, 58) between rods 46. In some applications, an operator may desire to have variable rod spacing. To change the rod configuration, one of the plates 60 is removed from the associated side 24, which allows rods 46 to be removed or additional rods to be inserted.

Figure 4:
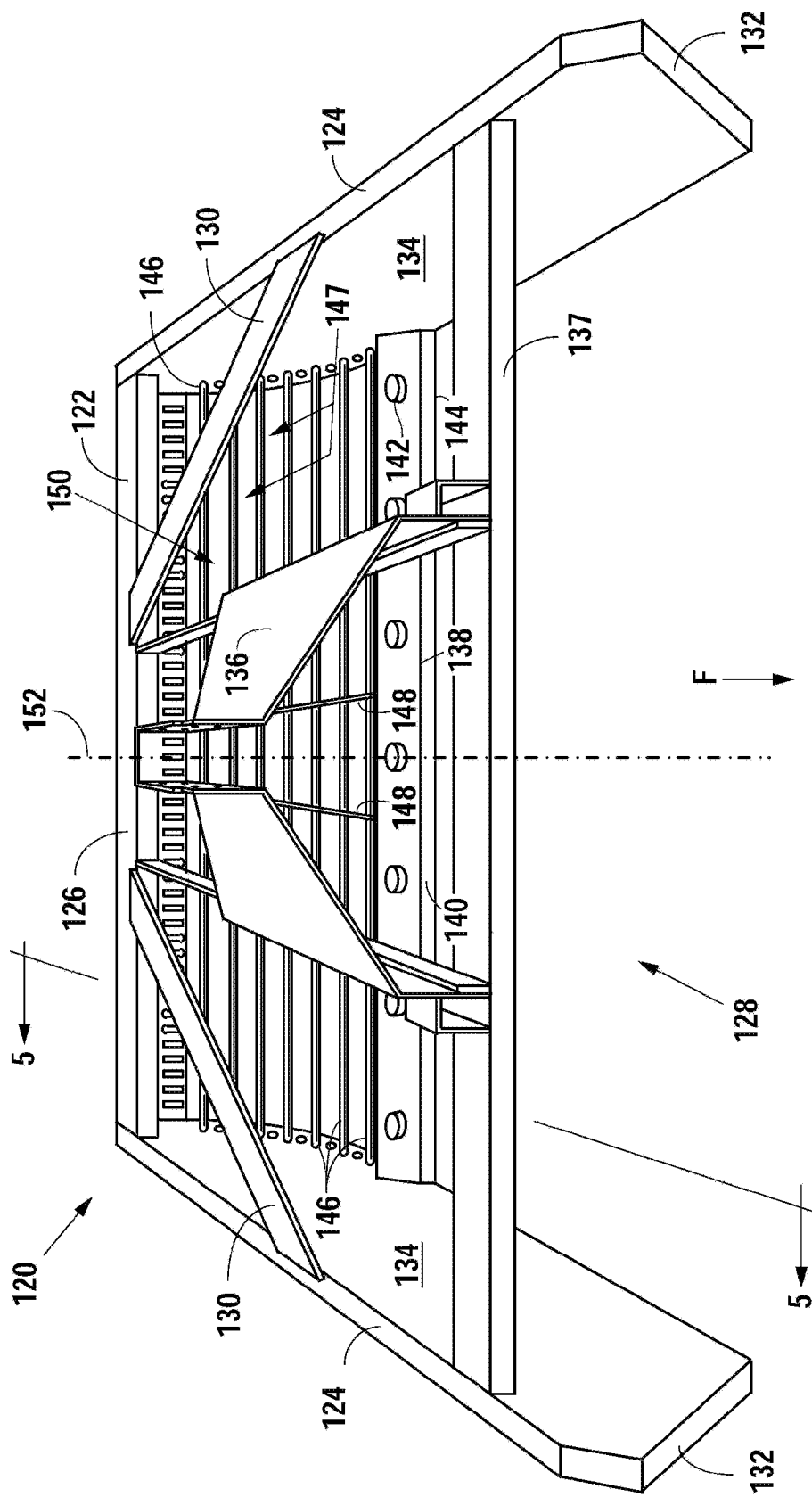
FIG. 4 is a front top view of a second embodiment of the invention.
Figure 5:
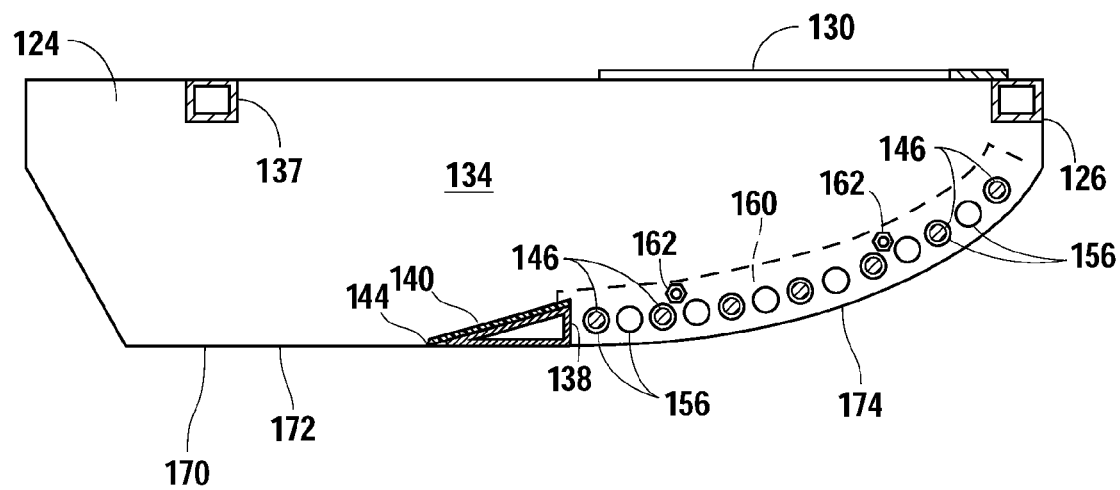
FIG. 5 is a section view through line 5-5 of FIG. 4.

FIGS. 4-5 show a second embodiment 120, which is designed to be towed behind an engineering vehicle in the forward direction F. Like the embodiment described with reference to FIGS. 1-3, this embodiment 120 includes a steel frame 122 having sides 124, a back 126, and an open front end 128. The sides 124 and back 126 are connected with struts 130. Each side 124 has a front end 132 and a planar inside surface 134. An upper metal crossbar 137 is connected to and between the sides 124 near the top of the embodiment 120. A mount 136 is attached to the upper crossbar 137 to provide for attachment to an engineering vehicle. A lower metal crossbar 138 extends between and is connected to the sides 124. A hardened scraper 140 is fastened to the top of the lower crossbar 138 with bolts 142. The scraper 140 has a front edge 144 aligned with the bottoms of the sides 124. Cylindrical metal rods 146 extend between the sides 124 through two curved L-beams 148 connected (e.g., welded) to the back 126 and the lower crossbar 138. A working volume 150 is bounded by the sides 124, the back 126, the lower crossbar 138, the rods 146, and space 147 between the rods 146. The embodiment 120 is symmetrical about a center plane 152.

Referring specifically to FIG. 5, each side 124 has a bottom 170 with a planar portion 172 that generally maintains contact with the ground and that is adjacent to a curved portion 174. The relationship between the rods 146 and holes 156 is as described with reference to FIGS. 1-3. In this embodiment, however, the rods 146 are in a non-planar configuration and have a curvature corresponding to the curved portion 174 of the bottom 170 of the sides 124. A cover plate 160 is attached to the outer surface of each side 124 and is identical to the plates 60 of the first embodiment except curved along its length to correspond to the curvature of the curved portion 174.

Use of this embodiment 120, described with reference to FIG. 4, is substantially similar to that described with reference to FIG. 1. In addition, however, the curved configuration of the rods 146 facilitates "turnover" of material that is forced against the back 126 of the embodiment 120. As material moves toward the back and accumulates, the shape of the working volume 150 causes the material to "fold over" in the forward direction F, thus facilitating an additional "sifting" action to separate, for example, rocks from top soil.

The present invention is described in terms of specifically-described embodiments. Those skilled in the art will recognize that other embodiments of such device can be used in carrying out the present invention. Other aspects and advantages of the present invention may be obtained from a study of this disclosure and the drawings, along with the appended claims.

I claim:

1. An attachment for an engineering vehicle, the attachment having comprising:
   a first side having an outer surface, an inner surface partially bounding a working volume, and a first plurality of surfaces extending between the outer surface and the inner surface defining a first plurality of holes having a hole diameter;
   a second side having an outer surface, an inner surface partially bounding the working volume, and a second plurality of surfaces extending between the outer surface and the inner surface defining a second plurality of holes having the hole diameter, the second plurality of holes being axially aligned with the first plurality of holes;
   a plurality of rods occupying at least some of the first plurality of holes and at least some of the second plurality of holes, each rod having a first end, a second end, a longitudinal axis intersecting the first end and the second end, a rod length between the first end and the second end along the longitudinal axis, and a rod diameter;
   a first plate mounted to the outer surface of the first side, the first plate not bounding the working volume and having a first section intersecting the longitudinal axes of the plurality of rods and spaced a distance from the outer surface of the first side; and
   a second plate mounted to the outer surface of the second side, the second plate not bounding the working volume and having a second section intersecting the longitudinal axes of the plurality of rods and spaced a distance from the outer surface of the second side, the distance along the longitudinal axes between the first section and the second section is greater than the rod length.

2. The attachment of claim 1 wherein each rod is free to rotate within its associated holes around its axes.

3. The attachment of claim 1 wherein each rod is free to move translationally along its axis.

4. The attachment of claim 1 wherein each rod is free to move radially relative to the axes of its associated holes.

5. The attachment of claim 1 wherein the rod diameter is less than 95% of the hole diameter.

6. The attachment of claim 5 wherein the rod diameter is less than 90% of the hole diameter.

7. The attachment of claim 6 wherein the rod diameter is less than 87.5% of the hole diameter.

8. The attachment of claim 1 wherein the plurality of rods is fixed to at least one of the first side and the second side.

9. The attachment of claim 1 wherein the longitudinal axes of the plurality of rods are coplanar.

10. The attachment of claim 1 wherein the longitudinal axes of the holes are arranged in a curved configuration.

11. The attachment of claim 1 wherein the plurality of holes and plurality of rods have circular cross sections.

12. The attachment of claim 1 further comprising a back connected to the first side and the second side and partially bounds a working volume.

13. The attachment of claim 1 wherein each rod of the plurality of rods contacts only one of the first section and the second section.

14. The attachment of claim 13 wherein the rod length is less than 95% of the distance along the longitudinal axes between the first section and the second section.

15. An attachment for an engineering vehicle, the attachment comprising:
   a first side having an outer surface, an inner surface, and a first plurality of surfaces extending between the outer surface and the inner surface defining a first plurality of holes having a hole diameter;
   a second side having an outer surface, an inner surface, and a second plurality of surfaces extending between the outer surface and the inner surface defining a second plurality of holes having the hole diameter, the second plurality of holes being axially aligned with the first plurality of holes;
   a plurality of rods occupying at least some of the first plurality of holes and at least some of the second plurality of holes, each rod having a first end, a second end, a longitudinal axis intersecting the first end and the second end, a rod length between the first end and the second end along the longitudinal axis, and a rod diameter;
   a first plate mounted to the outer surface of the first side, the first plate having a planar elongate first section in contact with the first side, a planar elongate second section intersecting the longitudinal axes of the plurality of rods and spaced a distance from the outer surface of the first side, and an intermediate section connected and angled relative to the first section and the second section; and
   a second plate mounted to the outer surface of the second side, the second plate having a planar elongate first section in contact with the second side, a planar elongate second section intersecting the longitudinal axes of the plurality of rods and spaced a distance from the outer surface of the second side, the distance along the longitudinal axes between the second section of the first plate and the second section of the second plate is greater than the rod length, and an intermediate section connected and angled relative to the first section and the second section.

16. The attachment of claim 15 wherein each rod is free to rotate within its associated holes around its axes.

17. The attachment of claim 15 wherein each rod is free to move translationally along its axis.

18. The attachment of claim 15 wherein each rod is free to move radially relative to the axes of its associated holes.

19. The attachment of claim 15 wherein each rod of the plurality of rods contacts no more than one of the second section of the first plate and the second section of the second plate.

* * * * *